T. H. PHILLIPS, Jr.
CLAM DREDGING MACHINE.
APPLICATION FILED AUG. 11, 1920.
1,415,113.
Patented May 9, 1922.
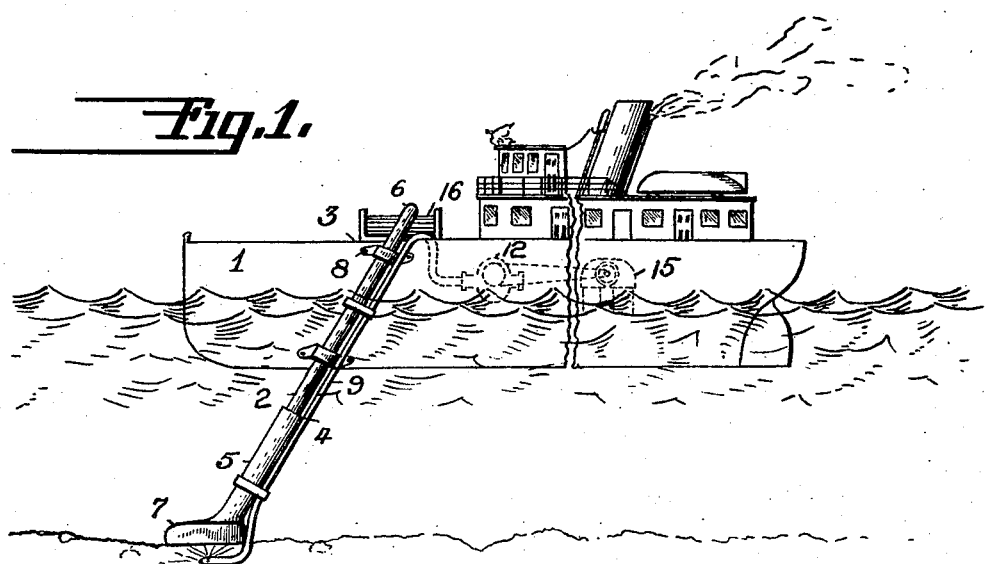
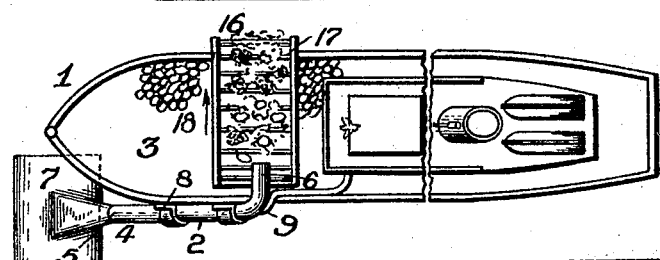
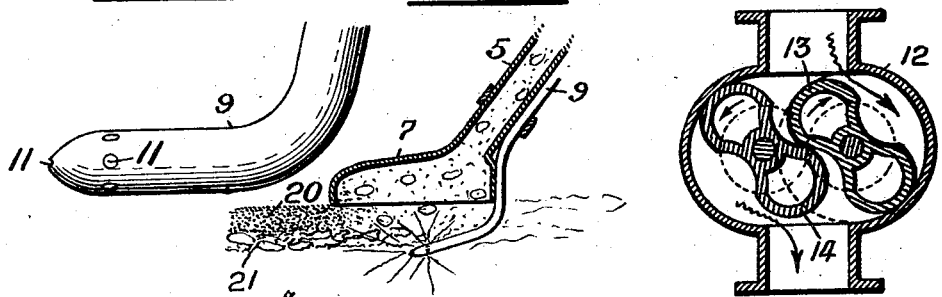
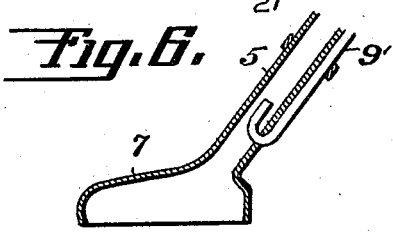
Inventor
THOMAS H. PHILLIPS, JR.
By his Attorney
Herbert H. Thompson

UNITED STATES PATENT OFFICE.

THOMAS H. PHILLIPS, JR., OF FORT MYERS, FLORIDA.

CLAM-DREDGING MACHINE.

1,415,113.   Specification of Letters Patent.   Patented May 9, 1922.

Application filed August 11, 1920. Serial No. 402,861.

*To all whom it may concern:*

Be it known that I, THOMAS H. PHILLIPS, Jr., a citizen of the United States of America, residing at Fort Myers, in the State of Florida, have invented certain new and useful Improvements in Clam-Dredging Machines, of which the following is a specification.

This invention relates to the clam and mussel industry. Along the coast and bays of the United States are buried millions of these edible bivalves, but the gathering of the same by the primitive methods now employed has proved so expensive and inadequate that large numbers of canning factories have had to close down for lack of clams.

The main object of this invention is to devise a simple apparatus whereby large quantities of clams or mussels or the like may be recovered directly from the sea bottom without damage to the clams. Other objects of the invention will be apparent as the description proceeds.

Referring to the drawings wherein I have shown what I now consider to be the preferred form of my invention:

Fig. 1 is a side elevation of the invention as applied to a vessel.

Fig. 2 is a plan view of the same.

Fig. 3 is an enlarged detail of the blower or air pipe.

Fig. 4 is a vertical section of the main or suction pipe, showing the air pipe secured thereto and their relative positions in operation.

Fig. 5 is a sectional view of one form of blower for the air.

Fig. 6 is a sectional view of a modified form of the invention.

I am aware that the principle of physics that a rising column of water may be produced in a vertical pipe partially submerged by the discharge of air below or within the pipe, has been employed in certain forms of marine dredges for placing spiles, etc., but while my invention employs this broad principle, the method of operation and results are very different.

Preferably my invention is employed in connection with a moving steamer 1 and consists of a more or less vertical pipe 2 preferably of sufficient length to reach from the deck 3 of the vessel to the bottom of the shallow water where clams abound and fastened to the vessel by any suitable means 8. The tube or pipe may be made collapsible or telescopic as indicated at 4 so that the lower end 5 of the tube may follow the contour of the bottom without disturbing the upper or discharge end 6. The lower end 5 preferably is equipped with a flaring hood or mouth 7 open on its under surface and adapted to rest upon and slide along the bottom. The mouth is preferably broader than it is long, being shown as rectangular in shape. For supplying air within the tube to cause a rising column therein, a second tube 9 secured to the larger pipe 2 is employed. Said tube may discharge air inside of the pipe as shown in Fig. 6, but I prefer to conduct the tube down below the main pipe somewhat as shown in Figs. 1 and 4, with the lower or discharge end bent under the mouth 7. Openings 11 are shown in the end of the tube 9 for the discharge of air. Preferably the end is bent slightly downwardly so as to assist the tube in plowing or burrowing below the surface of the bottom, thereby mechanically bulging up the bottom as well as by the action of the compressed air and rising water column. In certain waters where clams are very abundant, it is found that the bottom is composed of a layer 20 of very hard and tightly packed sand several inches thick, under which is a layer 21 of soft mud and ooze full of clams, mussels, etc. Ordinary methods of digging clams fail to penetrate this hard upper surface. By my method, on the other hand, the bottom is continuously disrupted by the forces described above and the clams, mud, sand, etc., carried up pipe 2. The supply of compressed air may be furnished by a pressure blower 12, such as shown in Fig. 5, having revolving paddles 13 and 14 geared together and driven by any suitable power source 15. The top of pipe 2 may discharge over a continuous conveyor 16 having cross slats 17 or other strainer so that the clams will be separated from the water and sand. The clam pickers stand alongside the conveyor and separate by hand the clams from the stones, conk shells, etc. It will be understood that the endless belt conveyor continuously travels in the direction of the arrow 18 and extends out over the water on the far side so that the seaweed, stones, etc., may, if desired, be automatically dumped overboard. Any suitable means (not shown) may be used to revolve the belt.

It should be noted that according to my method the clams are run through no pump of any kind which would tend to break them up, but are conveyed directly onto the deck. Furthermore, the use of my dredge does not destroy the clam beds themselves as do the bucket and other mechanical dredges that have been tried for this purpose, since no mechanical digger or other revoluble part disturbs the bed or breaks up the clams.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A clam or mussel dredging apparatus comprising a pipe adapted to extend obliquely downwardly into the water and having a mouth at an angle to said pipe to rest substantially flatly on the bottom, a second pipe adjacent the first pipe and arranged to discharge air or other gas so as to rise through the first pipe causing eruption of the bottom under said mouth and a rising current of air, water, and bottom, and means for forcing air through said second pipe.

2. A clam or mussel dredging apparatus for vessels, comprising a pipe adapted to be secured to the vessel to extend obliquely down to the bottom, said pipe having a flaring mouth at an angle to said pipe to slide over and rest upon the bottom as the vessel moves around the periphery of said mouth, a second pipe adjacent the first pipe and arranged to discharge air or other gas so as to rise through the first pipe causing eruption of the bottom under said mouth and a rising current of air, water, and bottom, and means for forcing air through said second pipe.

3. A clam or mussel dredging apparatus for vessels, comprising a pipe adapted to be secured to the vessel to extend down to the bottom, said pipe having a flaring mouth adapted to slide over the bottom as the vessel moves, a second pipe adjacent the first pipe and having its discharge end under said mouth and adapted to penetrate below the surface, means for forcing air through said second pipe and means adjacent the top of said first pipe whereby the clams may be separated from the bottom and water.

4. A clam or mussel dredging apparatus for vessels, comprising a pipe adapted to be secured to the vessel to extend down to the bottom, said pipe having a flaring mouth adapted to slide over the bottom as the vessel moves, a second pipe adjacent the first pipe and having its discharge end under said mouth and adapted to penetrate below the surface, means for forcing air through said second pipe, and means adjacent the top of said first pipe for separating the clams from water.

5. In an apparatus for dredging clams from a moving vessel, the combination with a pipe adapted to burrow slightly beneath the surface of the bottom as the vessel moves and having a discharge opening, means for discharging a fluid through said opening, a second pipe of larger diameter mounted with its lower end over said opening in said other pipe, said lower end being of much greater area than the diameter of said second pipe and adapted to rest flat on the bottom, and means for receiving the discharge from said larger pipe.

6. A clam dredging apparatus comprising a pipe adapted to extend from a vessel down adjacent the bottom, pneumatic means for producing an upward flow of water therethrough, and a conveyor adjacent the top of the pipe adapted to separate the solid substances from the water, whereby the clams may be picked out from the other substances.

7. A clam dredging apparatus comprising a pipe adapted to extend from a vessel down adjacent the bottom, pneumatic means for producing an upward flow of water therethrough, and a conveyor adjacent the top of the pipe adapted to separate the solid substances from the water, whereby the clams may be picked out from the other substances, said conveyor being arranged to dump said other substances overboard.

In testimony whereof I have affixed my signature.

THOMAS H. PHILLIPS, Jr.